June 14, 1960 R. B. COBLE 2,941,156
FREQUENCY DETECTING SYSTEM WITH GATED OUTPUT
Filed Oct. 2, 1958
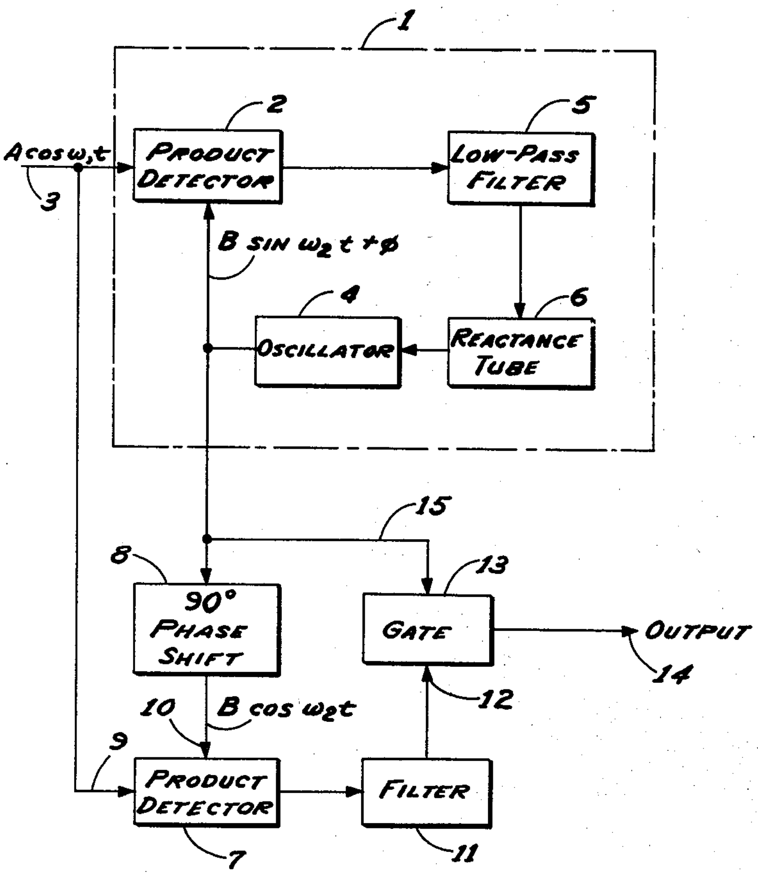
INVENTOR.
ROBERT B. COBLE
BY Marvin Moody
ATTORNEY
Glenn H. Antrim
AGENT 2,941,156

FREQUENCY DETECTING SYSTEM WITH GATED OUTPUT

Robert B. Coble, Cedar Rapids, Iowa, assignor to Collins Radio Company, Cedar Rapids, Iowa, a corporation of Iowa Filed Oct. 2, 1958, Ser. No. 764,867

2 Claims. (Cl. 331—30)

This invention is related to product detectors that are utilized for demodulating radio signals and particularly pertains to circuits for at times enabling the outputs of local oscillators that have other outputs for supplying reference signals continually to product detectors. The output of an oscillator that supplies signal to a product detector may be utilized in any equipment in which it is desired to detect variations in the frequency of an incoming signal for the oscillator is controlled so that its frequency of operation is equal to the frequency of the incoming signal.

In prior systems the oscillator operates continuously while the equipment is in operation regardless of interruptions of incoming signal so that the interpretation of the oscillator frequency is ambiguous. The operator is not informed as to whether the oscillator is operating at a particular frequency that is determined by an incoming signal or whether the oscillator is operating at an uncontrolled frequency that is the result of average circuit constants of the oscillator and the random noise that is applied to the frequency-controlled circuit.

In the present system an output circuit is connected to the oscillator only in response to the application of a signal to the input circuit of a product detector. Accordingly, the present invention comprises first and second product detectors that are connected to a signal input circuit, a frequency-controlled oscillator that is also connected to the first product detector, a phase shift circuit that connects the oscillator to the second product detector, and an output circuit for the second product detector connected to a gating circuit to enable an output circuit of the oscillator in response to the application of an input signal to the product detectors.

An object of this invention is to provide a frequency-controlled oscillator that supplies local signal to a product detector with an output circuit that is enabled only in response to the application of signal to the input circuit of the product detector.

The following description and the appended claims may be more readily understood with reference to the accompanying single drawing that shows a block diagram of the output control circuit of this invention as related to the local oscillator of a product detector.

In the conventional circuit 1, the product detector 2 receives an input signal, $A \cos \omega t$, from input circuit 3 and oscillator signal, $B \sin \omega_2 t+\phi$, from oscillator 4 wherein:

$A$=amplitude of the input wave
$\omega=2\pi$ times frequency
$t$=time
$\phi$=phase shift between the cosine of the input signal and the sine of the oscillator signal The product detector 2 is the conventional type that corresponds in construction to the usual modulator or mixer and may comprise two input transformers with center tapped secondary windings connected to a rectifying bridge circuit so that both alternating and direct components of the signal are provided between the center taps of the secondary windings. The application of the input signal and the oscillator signal to the inputs of the product detector provide in the output, signal equal to $$\frac{KAB}{2}(\sin[(\omega_1+\omega_2)t+\phi]+\sin[(\omega_1-\omega_2)t-\phi])$$

This signal is applied to the input of low-pass filter 5. The filter eliminates the sum frequencies of the signal as represented by the first term and passes to the reactance tube 6, the difference frequencies of the signal as represented by $$\frac{KAB}{2}(\sin[(\omega_1-\omega_2)t-\phi])$$

When the oscillator 4 is operating at a frequency that is equal to the frequency of the input signal, $\omega_1$ equals $\omega_2$, and the output of the filter becomes $$\frac{KAB}{2}\sin(-\phi)$$

When $\phi$ approaches 0° the output voltage of the reactance tube causes the oscillator to generate a signal substantially equal to $B \sin \omega_2 t$. Therefore, it is apparent that the frequency of the signal generated by the oscillator is equal to the frequency of the incoming signal, but that the phase of the oscillator signal is shifted 90° with respect to the phase of the incoming signal. The application of signal that is shifted by 90° to the product detector provides in its output, signal that is relatively free from noise as compared with the output that might be derived by applying the input signal to a conventional diode detector.

The control circuit of this invention has a second product detector 7 with an input circuit 9 that is connected to the input circuit 3 of the detecting system. A second input of the product detector derives from oscillator 4 signal that is shifted 90° with respect to the local signal that is applied to product detector 2. This 90° phase shift is provided by phase shift network 8 that is connected between the output of oscillator 4 and input 10 of product detector 7. When the signal applied to input 9 is $A \cos \omega_1 t$, the signal applied to input 10 is $B \cos \omega_2 t$. The output of the product detector is, therefore, $$\frac{KAB}{2}+\frac{KAB}{2}\cos 2\omega t$$

Low pass filter 11 removes the alternating current component and leaves the direct current component $$\frac{KAB}{2}$$

for application to input circuit 12 of gate 13. Gate 13 is conventional and is responsive to the application of voltage to control circuit 12 for connecting the output of oscillator 4 through input 15 to the output line 14. The product detecting system as described herein may be applied to any receiving system in which it is desirable to follow the frequency of the incoming signal. For example, when the system is applied to a doppler radar receiving system, output is derived only when transmitted signal is reflected from a target to the receiving system. By using product detectors for controlling the frequency of the local oscillator and also for controlling the gate circuit that is connected to the output of the local oscillator, the system provides an indication of the frequency of the received signal, such as the doppler frequency of a radar signal, even when the noise level is high compared with the intensity of the received signal. The gate circuit effectively disconnects the local oscillator from the output line of the system when no signal is present or when the signal is so small that the noise is extremely predominant.

Although the detecting system of this invention has been described with reference to a single embodiment that is shown in the accompanying drawing, the system may be changed in obvious ways by those skilled in the art and still be within the spirit and scope of the following claims.

What is claimed is:

1. A product detecting system having a gated output comprising, a first product detector, an input circuit for applying incoming signal with varying frequency to said first product detector, a local oscillator, said first product detector receiving local signal from said oscillator, means connected to said first product detector responsive to the application of said incoming signal and said local signal to said first product detector for controlling the frequency of said oscillator so that the frequency of signal generated by said oscillator is equal to the frequency of said incoming signal, a gate having a switching circuit and a control circuit, an output circuit, said oscillator being connected through said gate switching circuit to said output circuit, said gate switching circuit normally being open during the absence of substantial input signal, a second product detector having an input terminal connected to said input circuit and an output terminal connected to said gate control circuit, said second product detector being responsive to the application of signal to said input circuit for closing said gate switching circuit, and said gate switching circuit thereby being closed only during application of substantial signal to connect said output circuit to said oscillator for applying signal having a frequency equal to the frequency of said incoming signal to said output circuit.

2. A product detecting system having a gated output comprising, a first product detector, an input circuit for applying incoming signal with varying frequency to said first product detector, a local oscillator, said first product detector receiving local signal from said oscillator, means responsive to the output of said first product detector that is derived from the application of said incoming signal and said local signal to said product detector for controlling a frequency of said oscillator so that the signal generated by said oscillator has a frequency equal to the frequency of said incoming signal but is shifted 90° in phase, a gate, an output circuit, said oscillator and said output circuit being connected to said gate, a second product detector, a 90° phase shift network connected between said oscillator and said second product detector, said second product detector being also connected to said input circuit, a filter, said second product detector being connected through said filter to said gate, said gate being operated by application of signal from said filter in response to the application of signal from said input circuit to said second product detector, and said gate operating to connect said output circuit to said oscillator for applying signal having a frequency equal to the frequency of said incoming signal to said output circuit.

References Cited in the file of this patent

UNITED STATES PATENTS 2,866,161 Davidoff ............. Dec. 23, 1958